United States Patent
Sorace et al.

(10) Patent No.: US 12,494,704 B2
(45) Date of Patent: Dec. 9, 2025

(54) POWER SUPPLY CIRCUIT AND OPERATING METHOD

(71) Applicant: NXP B.V., Eindhoven (NL)

(72) Inventors: Christian Vincent Sorace, Falicon (FR); Vincent Regnauld, Herouville Saint Clair (FR); Ludovic Oddoart, Opio (FR); Nicolas Patrick Vantalon, Cannes (FR)

(73) Assignee: NXP B.V., Eindhoven (NL)

( * ) Notice: Subject to any disclaimer, the term of this patent is extended or adjusted under 35 U.S.C. 154(b) by 202 days.

(21) Appl. No.: 18/526,107

(22) Filed: Dec. 1, 2023

(65) Prior Publication Data

US 2024/0223084 A1    Jul. 4, 2024

(30) Foreign Application Priority Data

Jan. 4, 2023 (EP) .................................... 23305006

(51) Int. Cl.
*H02M 3/158* (2006.01)
*H02M 1/00* (2006.01)

(52) U.S. Cl.
CPC ......... *H02M 1/0045* (2021.05); *H02M 3/158* (2013.01)

(58) Field of Classification Search
CPC .............................. H02M 3/158; H02M 1/0045
See application file for complete search history.

(56) References Cited

U.S. PATENT DOCUMENTS

| | | | |
|---|---|---|---|
| 8,823,341 B2 | 9/2014 | Polarouthu et al. | |
| 9,088,210 B2 | 7/2015 | Oddoart et al. | |
| 9,804,617 B2 | 10/2017 | Turkewadikar et al. | |
| 2016/0190926 A1* | 6/2016 | Ni | H02M 3/158 323/280 |
| 2017/0147020 A1* | 5/2017 | Turkewadikar | G05F 1/56 |
| 2017/0160756 A1* | 6/2017 | Hsieh | H02M 3/155 |
| 2019/0267897 A1* | 8/2019 | Hsieh | H02M 3/158 |
| 2020/0136516 A1* | 4/2020 | Chesneau | H02M 3/1588 |
| 2020/0321865 A1 | 10/2020 | Bogue et al. | |
| 2020/0321875 A1* | 10/2020 | Bogue | H02M 3/1588 |

* cited by examiner

*Primary Examiner* — Alex Torres-Rivera

(57) ABSTRACT

In accordance with a first aspect of the present disclosure, a power supply circuit is provided, comprising: a first output node and a second output node; an inductor detection unit configured to detect whether an inductor is present at the first output node and to output a corresponding detection signal; a mode control unit configured to control an operating mode of the power supply circuit in dependence on said detection signal; wherein the inductor detection unit is configured to detect whether said inductor is present by pulling down the first output node, deriving a reference voltage from the second output node, and comparing a voltage level of the first output node with said reference voltage. In accordance with a second aspect of the present disclosure, a corresponding method of operating a power supply circuit is conceived.

18 Claims, 3 Drawing Sheets

POWER SUPPLY CIRCUIT AND OPERATING METHOD

CROSS-REFERENCE TO RELATED APPLICATIONS

This application claims priority under 35 U.S.C. § 119 to European patent application no. 23305006.1, filed Jan. 4, 2023, the contents of which are incorporated by reference herein.

TECHNICAL FIELD

The present disclosure relates to a power supply circuit. Furthermore, the present disclosure relates to a corresponding method of operating a power supply circuit.

BACKGROUND

Power supply circuits may be used to supply power to different components of host devices in which they are used. These power supply circuits, which may also be referred to as power management units (PMUs), may operate in different modes. For instance, a power supply circuit may be configured to operate in a switch mode, by means of which a high power efficiency may be achieved. In that case, the power supply circuit effectively acts as an inductive switching converter. When the power supply circuit operates in this switch mode, a DC-DC converter may be used to convert an input signal into a supply signal for said components. However, in order to enable the DC-DC functionality, an inductor should be implemented at an output node of the power supply circuit. A multi-mode power supply circuit may typically also be configured to operate in a linear mode, which results in a lower power efficiency compared to the switch mode. When the power supply circuit operates in this linear mode, a low-dropout (LDO) regulator may be used to generate the supply signal. The linear mode typically results in a lower cost, because no inductor needs to be present at the output node through which the supply signal is output. However, it may be difficult to determine automatically in which mode a multi-mode power supply circuit should be configured to operate.

SUMMARY

In accordance with a first aspect of the present disclosure, a power supply circuit is provided, comprising: a first output node and a second output node; an inductor detection unit configured to detect whether an inductor is present at the first output node and to output a corresponding detection signal; a mode control unit configured to control an operating mode of the power supply circuit in dependence on said detection signal; wherein the inductor detection unit is configured to detect whether said inductor is present by pulling down the first output node, deriving a reference voltage from the second output node, and comparing a voltage level of the first output node with said reference voltage.

In one or more embodiments, the inductor detection unit is configured to detect that the inductor is present if the reference voltage is smaller than the voltage level of the first output node, and to detect that the inductor is not present if the reference voltage is not smaller than the voltage level of the first output node.

In one or more embodiments, the inductor detection unit comprises a comparator and a pull-down unit coupled between the comparator and the first output node, and the comparator is configured to receive the voltage level of the first output node and the reference voltage as inputs.

In one or more embodiments, the inductor detection unit comprises a resistor ladder coupled between the second output node and the comparator, and the reference voltage is an image of an output level of the second output node, said image being provided to the comparator through said resistor ladder.

In one or more embodiments, the mode control unit is a finite state machine.

In one or more embodiments, the power supply circuit further comprises a low-frequency oscillator configured to provide a clock signal to the finite state machine.

In one or more embodiments, the mode control unit is configured to cause the power supply circuit to operate in a first operating mode if the detection signal indicates that the inductor is present, wherein the first operating mode is a switch mode of operation.

In one or more embodiments, the switch mode of operation is a DC-DC converter mode.

In one or more embodiments, the mode control unit is configured to cause the power supply circuit to operate in a second operating mode if the detection signal indicates that the inductor is not present, wherein the second operating mode is a linear mode of operation.

In one or more embodiments, the linear mode of operation is a low-dropout regulator mode.

In one or more embodiments, a host device comprises the power supply circuit of any preceding claim.

In accordance with a second aspect of the present disclosure, a method of operating a power supply circuit is conceived, comprising: detecting, by an inductor detection unit comprised in the power supply circuit, whether an inductor is present at a first output node of the power supply circuit, and outputting a corresponding detection signal, wherein the inductor detection unit detects whether said inductor is present by pulling down the first output node, deriving a reference voltage from a second output node of the power supply circuit, and comparing a voltage level of the first output node with said reference voltage; controlling, by a mode control unit comprised in the power supply circuit, an operating mode of the power supply circuit in dependence on said detection signal.

In one or more embodiments, the inductor detection unit detects that the inductor is present if the reference voltage is smaller than the voltage level of the first output node, and detects that the inductor is not present if the reference voltage is not smaller than the voltage level of the first output node.

In one or more embodiments, the inductor detection unit comprises a comparator and a pull-down unit coupled between the comparator and the first output node, and the comparator receives the voltage level of the first node and the reference voltage as inputs.

In one or more embodiments, the inductor detection unit comprises a resistor ladder coupled between the second output node and the comparator, and the reference voltage is an image of an output level of the second output node, said image being provided to the comparator through said resistor ladder.

DESCRIPTION OF DRAWINGS

Embodiments will be described in more detail with reference to the appended drawings.

DESCRIPTION OF EMBODIMENTS

Multi-mode power supply circuits may operate in different modes. Some of these modes may achieve a high power efficiency at the cost of additional hardware. In particular, a switch mode of operation may result in a very high power efficiency. However, in order to operate in this mode, an inductor (for example, a coil) is needed at an output node of the power supply circuit. To avoid the use of such an inductor, the power supply circuit may operate in a linear mode as well. Thus, a customer may integrate the multi-mode power supply circuit in a host device and enable only the linear mode, thereby eliminating the need to place an inductor at the output node of the power supply circuit. In this way, the customer may reduce the cost and size of the host device. However, other customers might want to configure the power supply circuit in a switch mode, in order to achieve the aforementioned high power efficiency. To increase the convenience with which a multi-mode power supply circuit can be integrated into a host device, an automatic determination of the desired mode of operation would be helpful. However, as mentioned above, it may be difficult to determine automatically in which mode a multi-mode power supply circuit should be configured to operate. More specifically, in order to achieve this purpose, it should be determined automatically whether or not an inductor is present at an output node of the power supply circuit.

Now discussed are a power supply circuit and a corresponding method of operating a power supply circuit, which facilitate an automatic determination of the mode in which the power supply circuit should be configured to operate. The power supply circuit may be used to advantage in a host device, more specifically to power different components of said host device.

Figure 1:
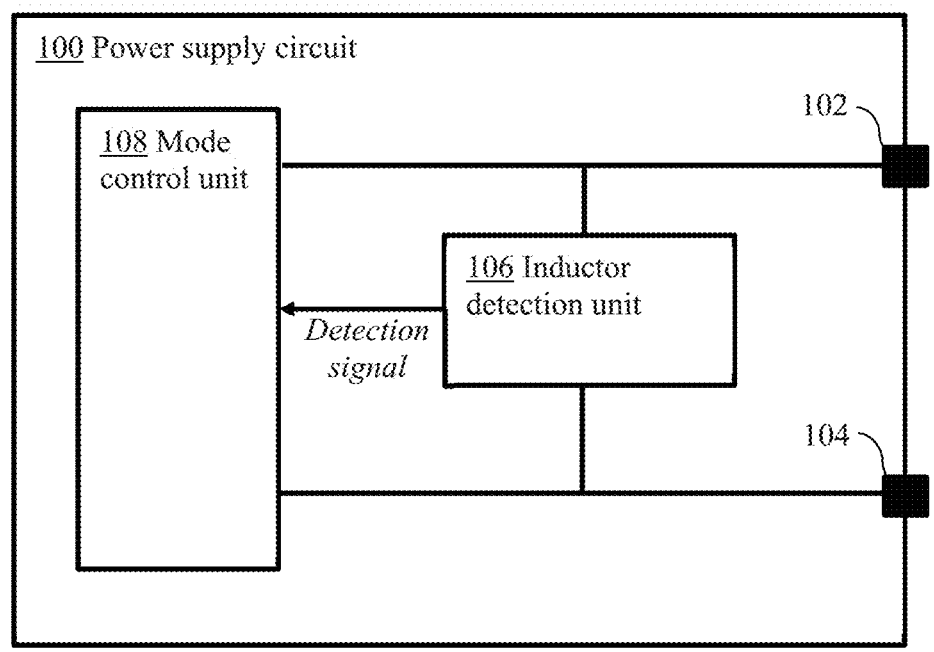
FIG. 1 shows an illustrative embodiment of a power supply circuit.

FIG. 1 shows an illustrative embodiment of a power supply circuit 100. The power supply circuit 100 comprises a first output node 102 and a second output node 104. Furthermore, the power supply circuit 100 comprises an inductor detection unit 106 configured to detect whether an inductor (not shown) is present at the first output node 102 and to output a corresponding detection signal. In particular, the detection signal is indicative of whether or not the inductor is present at the first output node 102. In addition, the power supply circuit 100 comprises a mode control unit 108 configured to control an operating mode of the power supply circuit 100 in dependence on said detection signal. Furthermore, the inductor detection unit 106 is configured to detect whether said inductor is present by pulling down the first output node 102, deriving a reference voltage from the second output node 104, and comparing a voltage level of the first output node 102 with said reference voltage. In this way, it may be determined automatically whether the inductor is present at the first output node 102, in a relatively simple manner. For instance, no expensive hardware components are needed to implement this automatic determination of the desired mode. It is noted that the inductor which should be detected is typically provided outside the power supply circuit 100, more specifically between the first output node 102 and the second output node 104. This is illustrated in more detail in FIG. 3. It is noted that the first output node 302 shown in FIG. 3 corresponds to the first output node 102 shown in FIG. 1, and that the second output node 304 shown in FIG. 3 corresponds to the second output node 104 shown in FIG. 1. An example of an inductor is a coil mounted on a printed circuit board (not shown). The skilled person will appreciate that other types of inductors, for example ferrite beads, may also be used.

In one or more embodiments, the inductor detection unit is configured to detect that the inductor is present if the reference voltage is smaller than the voltage level of the first output node, and to detect that the inductor is not present if the reference voltage is not smaller than the voltage level of the first output node. In this way, a simple criterion is provided to determine automatically whether the inductor is present. Furthermore, in one or more embodiments, the inductor detection unit comprises a comparator and a pull-down unit coupled between the comparator and the first output node, and the comparator is configured to receive the voltage level of the first node and the reference voltage as inputs. This results in a practical implementation, according to which the voltage level of the first output node and the reference voltage can easily be compared.

In one or more embodiments, the inductor detection unit comprises a resistor ladder coupled between the second output node and the comparator, and the reference voltage is an image of an output level of the second output node, said image being provided to the comparator through said resistor ladder. In this way, the reference voltage can easily be derived from the second output node. Furthermore, in one or more embodiments, the mode control unit is a finite state machine. This results in a practical implementation of the mode control unit. Furthermore, in a practical implementation, the power supply circuit comprises a low-frequency oscillator configured to provide a clock signal to the finite state machine.

In one or more embodiments, the mode control unit is configured to cause the power supply circuit to operate in a first operating mode if the detection signal indicates that the inductor is present, wherein the first operating mode is a switch mode of operation. In this way, the power supply circuit may automatically be configured in a mode of operation that provides a high power efficiency, if the inductor has been detected. In a practical implementation, the switch mode of operation is a DC-DC converter mode. Furthermore, in one or more embodiments, the mode control unit is configured to cause the power supply circuit to operate in a second operating mode if the detection signal indicates that the inductor is not present, wherein the second operating mode is a linear mode of operation. In this way, the power supply circuit may automatically be configured in a low-cost mode of operation, if the inductor has not been detected. In a practical implementation, the linear mode of operation is a low-dropout regulator mode.

Figure 2:
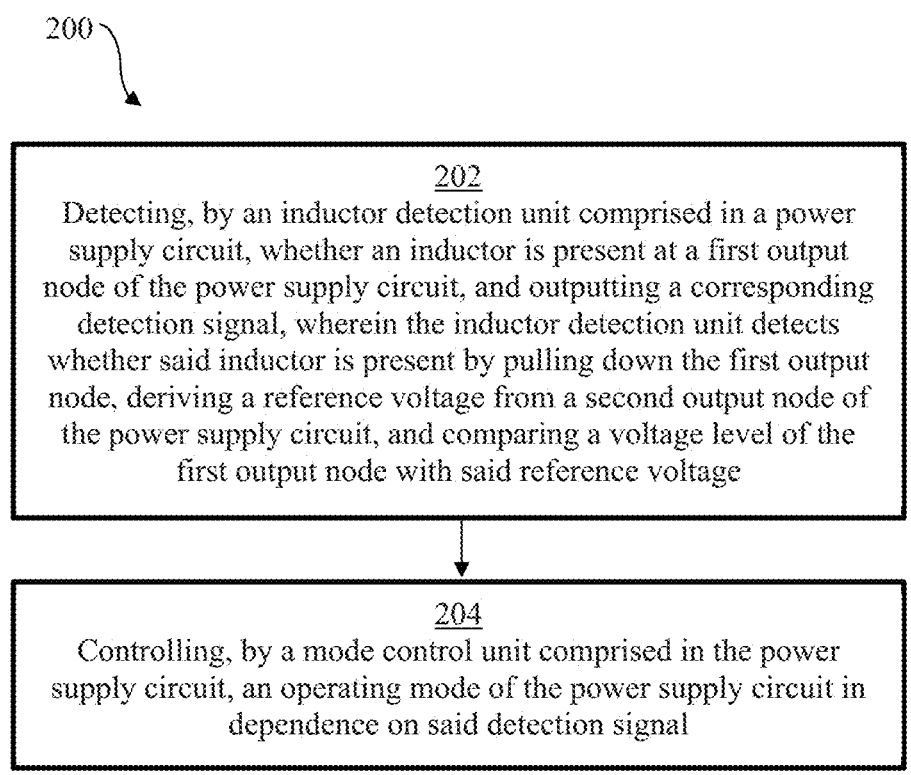
FIG. 2 shows an illustrative embodiment of a method of operating a power supply circuit.

FIG. 2 shows an illustrative embodiment of a method 200 of operating a power supply circuit. The method 200 comprises the following steps. At 202, an inductor detection unit comprised in a power supply circuit detects whether an inductor is present at a first output node of the power supply circuit, and outputs a corresponding detection signal. More specifically, the inductor detection unit detects whether said inductor is present by pulling down the first output node, deriving a reference voltage from a second output node of the power supply circuit, and comparing a voltage level of the first output node with said reference voltage. Furthermore, at 204, controlling, by a mode control unit comprised in the power supply circuit controls an operating mode of the power supply circuit in dependence on said detection signal.

As mentioned above, in this way, it may be determined automatically whether the inductor is present, in a relatively simple manner.

It is noted that the inductor detection allows to boot automatically a power supply circuit (i.e., a power management unit) in a first mode or a second mode, according to the inductor presence. The first mode may be DC-DC converter mode, while the second mode may be low-dropout regulator mode. In this way, different customer requests, in terms of bill of material cost or power efficiency, may be addressed with the same power supply circuit. More specifically, in power supply circuits destined for several customers, designers have to face different and potentially conflicting requests related to power consumption, bill of material and power efficiency. On the one hand, some customers aim at manufacturing products with a high efficiency. In that case, the power supply circuit integrated in such products may use a DC-DC converter in order to benefit from the high efficiency of the DC-DC converter. On the other hand, some customers pay attention to the cost of bill of materials and printed circuit board (PCB) area. For instance, these customers may not want to include an additional coil in their products. In that case, the power supply circuit cannot use a DC-DC converter. However, the power supply circuit may use a low-dropout regulator instead of a DC-DC converter.

In accordance with the present disclosure, a power supply circuit may automatically detect the presence of an inductor and manage a boot sequence accordingly. More specifically, the power supply circuit may be started either in a DC-DC converter mode or in a low-dropout regulator mode, depending on whether the inductor is present. In addition, the inductor presence detection feature avoids programming a memory (e.g., a flash memory) with a value that is used to indicate to the power supply circuit in which mode it should start. Furthermore, the inductor presence detection feature may avoid overstress on components which are external to the power supply circuit, such as PCB components on supplied modules. In particular, overstress may occur if the power supply circuit wrongly operates in the DC-DC converter mode (i.e., if it operates in the DC-DC converter mode when no inductor is present). For example, this may be caused by a wrongly programmed PMU mode in the memory. The inductor presence detection feature eliminates the need for human programming, and consequently reduces the likelihood that the power supply circuit wrongly operates in the DC-DC converter mode. The inductor detection unit facilitates checking the presence of an electrical path or an open path between the first output node and the second output node of the power supply circuit, thereby effectively detecting the presence, respectively absence, of the inductor.

Figure 3:
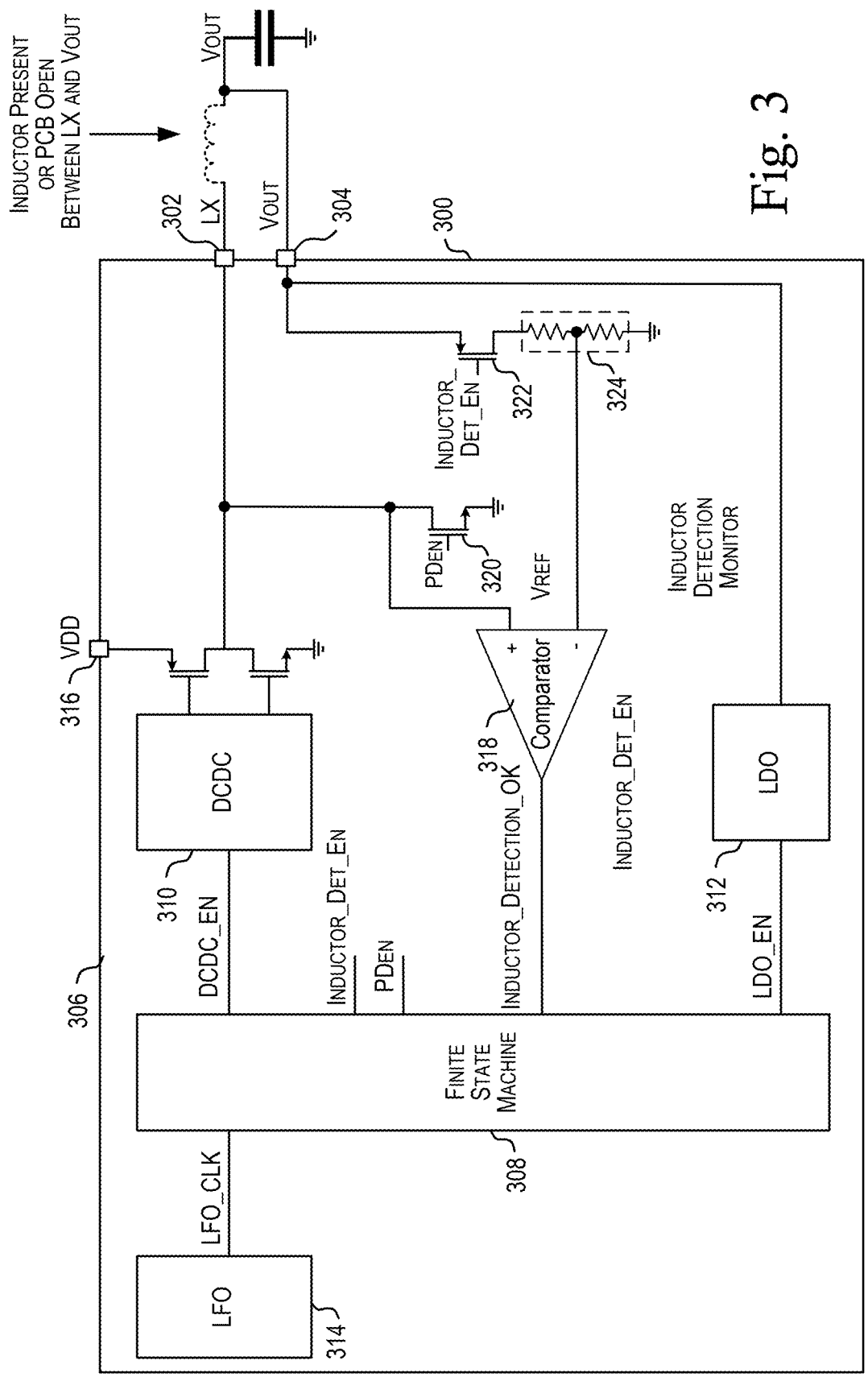
FIG. 3 shows another illustrative embodiment of a power supply circuit.

FIG. 3 shows another illustrative embodiment of a power supply circuit 300. The power supply circuit 300 comprises a first output node (LX) 302 and a second output node (VOUT) 304. Furthermore, the power supply circuit 300 comprises an induction detection monitor 306 (i.e., an induction detection unit) configured to detect whether an inductor is present at the first output node 302 and to output a corresponding detection signal. In particular, the detection signal is indicative of whether or not the inductor is present. In addition, the power supply circuit 300 comprises a mode control unit, which is implemented as a finite state machine 308. The finite state machine 308 is configured to control an operating mode of the power supply circuit 300 in dependence on the detection signal, which it receives from the inductor detection monitor 308.

The inductor detection monitor 306 is configured to detect whether or not the inductor is present by pulling down the first output node 302, deriving a reference voltage from the second output node 304, and comparing a voltage level of the first output node 302 with said reference voltage. In this example, the first output node 302 is pulled down by means of a pull-down transistor 320 coupled between the first output node 302 and a comparator 318 that forms part of the inductor detection monitor 306. Furthermore, the reference voltage is derived from the second output node 304 using a resistor ladder 324, which provides an image of the output level of the second output node 304 to the comparator 318. Then, the comparator 318 performs the comparison of the voltage level of the first output node 302 with the reference voltage, and outputs the detection signal, labeled with INDUCTOR_DETECTION_OK. The resistor ladder 324 may be enabled by means of an induction detection enable transistor 322. The finite state machine 308 causes the power control circuit 300 to operate in a switch mode if the detection signal indicates that an inductor is present. In the switch mode, a DC-DC converter 310, which is integrated into the power control circuit 300, is enabled. The finite state machine 308 causes the power control circuit 300 to operate in a linear mode if the detection signal indicates that an inductor is not present. In the linear mode, a low-dropout regulator (LDO) 312, which is integrated into the power control circuit 300, is enabled. It noted that the LDO output is the second output node 304 in case no inductor is present, because there is an open between the first output node 302 and the second output node 304. Furthermore, the switching node of the DC-DC converter 310 is the first output node 302 in case the inductor is present. In that case, the second output node 304 becomes the regulated output voltage of the DC-DC converter 310.

The power supply circuit 300 may operate in two different phases: an inductor detection phase and a normal operational phase. The power supply circuit 300 enters the normal operational phase when the inductor detection phase has been completed. In the normal operational phase, the switching node of the DC-DC converter 310 is the first output node 302, and the second output node 304 becomes the regulated output voltage of the DC-DC converter 310, in case an inductor is present at the first output node 302 (for example, if an inductor is present on a PCB on which the power supply circuit 300 is mounted). Furthermore, in the normal operational phase, a linear regulator (i.e., low-dropout regulator 312) will generate an output voltage at the second output node 304 in case the inductor is not present at the first output node 302. In either case, an external capacitor is present at the second output node 304, for example on said PCB.

In the inductor detection phase, the comparator 318 compares the voltage level on the first output node 302 with the reference voltage (VREF), which is an image of the voltage level (VOUT) on the second output node 304 obtained through a resistor ladder 324. A small pull-down transistor 320 is activated during the inductor presence detection sequence to pull the first output node 302 down. The resistor ladder 324 generates a reduced reference voltage VREF based on the voltage VOUT, which is used as a reference for the comparison performed by the comparator 318. The finite state machine 308 manages the inductor presence detection sequence as well as the boot sequence of the power supply circuit 300. Furthermore, a low frequency oscillator 314 is used as clock input for the finite state machine 308.

Figure 4:
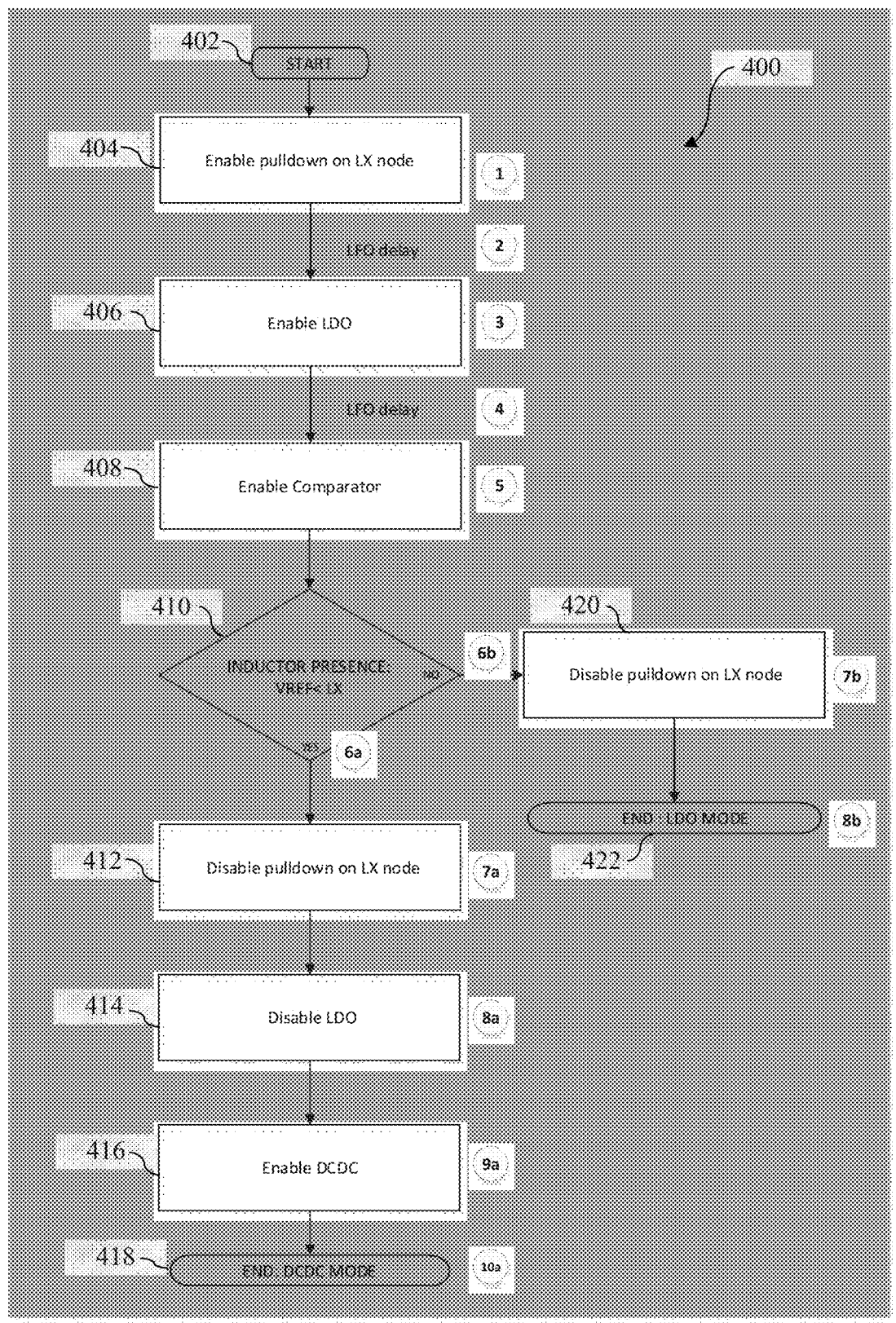
FIG. 4 shows another illustrative embodiment of a method of operating a power supply circuit.

FIG. 4 shows another illustrative embodiment of a method 400 of operating a power supply circuit. The method 400 comprises the following steps. At 402, the method starts. At 404, a pull-down is enabled on the first output node, i.e., the LX node (which may also be referred to as the switching node of the DC-DC converter). More specifically, a finite state machine enables a pull-down connected to LX node to set this node voltage to ground. Then, a delay is defined using a low-frequency oscillator, based on a counter. At 406, a low-dropout regulator is enabled in order to set the second output node to a desired voltage VOUT. Consequently, the voltage on the second output node rises to the desired voltage. Then, an additional delay is defined using the low-frequency oscillator, based on a counter. At 408, a comparator is enabled. The comparator compares the LX node voltage with a reference voltage VREF, which is an image of VOUT obtained through a resistor ladder. At 410, it is concluded that an inductor is present if VREF is smaller than the LX node voltage. It means that LX=VOUT due to the DC current path of the inductor. Furthermore, VREF<VOUT due to the resistor ladder. The presence of an inductor implies that a customer wants to focus on power efficiency.

If it is concluded that an inductor is present, the method continues at 412. Then, the pull-down on the LX node is disabled. Furthermore, at 414, the low-dropout regulator is disabled, and at 416, the DC-DC converter is enabled. Thereby, the power supply circuit is effectively configured to operate in a switch mode. The skilled person will appreciate that steps 414 and 416 may also be swapped. Thus, the DC-DC converter may be enabled before the low-dropout regulator is disabled. Finally, at 418, the method 400 ends with the power supply circuit operating in the switch mode, in particular a DC-DC converter mode. However, if it is concluded that an inductor is not present, the method continues at 420. At 420, the pull-down on the LX node is disabled, and the power supply circuit remains configured to operate in a linear mode. Then, at 422, the method 400 ends with the power supply circuit operating in the linear mode, in particular a low-dropout regulator mode.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 power supply circuit
102 first output node
104 second output node
106 inductor detection unit
108 mode control unit
200 method of operating a power supply circuit
202 detecting, by an inductor detection unit comprised in a power supply circuit, whether an inductor is present at a first output node of the power supply circuit, and outputting a corresponding detection signal, wherein the inductor detection unit detects whether said inductor is present by pulling down the first output node, deriving a reference voltage from a second output node of the power supply circuit, and comparing a voltage level of the first output node with said reference voltage
204 controlling, by a mode control unit comprised in the power supply circuit, an operating mode of the power supply circuit in dependence on said detection signal
300 power supply circuit
302 first output node (LX)
304 second output node (VOUT)
306 inductor detection monitor
308 finite state machine
310 DC-DC converter
312 low-dropout regulator (LDO)
314 low-frequency oscillator
316 input node (VDD)
318 comparator
320 pull-down transistor
322 inductor detection enable transistor
324 resistor ladder
400 method of operating a power supply circuit
402 start
404 enable pull-down on LX node
406 enable LDO
408 enable comparator
410 inductor presence: VREF<LX
412 disable pull-down on LX node
414 disable LDO
416 enable DC-DC converter
418 end: DC-DC mode
420 disable pull-down on LX node
422 end: LDO mode

What is claimed is:
1. A power supply circuit, comprising:
a first output node and a second output node;

an inductor detection unit configured to detect whether an inductor is present at the first output node and to output a corresponding detection signal, the inductor detection unit comprises:
a comparator; and
a pull-down unit coupled between the comparator and the first output node;
a mode control unit configured to control an operating mode of the power supply circuit in dependence on said detection signal;
wherein the inductor detection unit is configured to detect whether said inductor is present by pulling down the first output node, deriving a reference voltage from the second output node, and comparing a voltage level of the first output node with said reference voltage; and
wherein the comparator is configured to receive the voltage level of the first output node and the reference voltage as inputs.

2. The power supply circuit of claim 1, wherein the inductor detection unit is configured to detect that the inductor is present if the reference voltage is smaller than the voltage level of the first output node, and to detect that the inductor is not present if the reference voltage is not smaller than the voltage level of the first output node.

3. The power supply circuit of claim 1, wherein the inductor detection unit comprises a resistor ladder coupled between the second output node and the comparator, and wherein the reference voltage is an image of an output level of the second output node, said image being provided to the comparator through said resistor ladder.

4. The power supply circuit of claim 1, wherein the mode control unit is a finite state machine.

5. The power supply circuit of claim 4, further comprising an oscillator configured to provide a clock signal to the finite state machine.

6. The power supply circuit of claim 1, wherein the mode control unit is configured to cause the power supply circuit to operate in a first operating mode if the detection signal indicates that the inductor is present, wherein the first operating mode is a switch mode of operation.

7. The power supply circuit of claim 6, wherein the switch mode of operation is a DC-DC converter mode.

8. The power supply circuit of claim 1, wherein the mode control unit is configured to cause the power supply circuit to operate in a second operating mode if the detection signal indicates that the inductor is not present, wherein the second operating mode is a linear mode of operation.

9. The power supply circuit of claim 8 wherein the linear mode of operation is a low-dropout regulator mode.

10. A host device comprising the power supply circuit of claim 1.

11. A method of operating a power supply circuit, comprising:
detecting, by an inductor detection unit comprised in the power supply circuit, whether an inductor is present at a first output node of the power supply circuit, and outputting a corresponding detection signal, wherein the inductor detection unit detects whether said inductor is present by pulling down the first output node, deriving a reference voltage from a second output node of the power supply circuit, and comparing a voltage level of the first output node with said reference voltage;
controlling, by a mode control unit comprised in the power supply circuit, an operating mode of the power supply circuit in dependence on said detection signal; and
wherein the inductor detection unit comprises a comparator and a pull-down unit coupled between the comparator and the first output node, and wherein the comparator receives the voltage level of the first node and the reference voltage as inputs.

12. The method of claim 11, wherein the inductor detection unit detects that the inductor is present if the reference voltage is smaller than the voltage level of the first output node, and detects that the inductor is not present if the reference voltage is not smaller than the voltage level of the first output node.

13. The method of claim 11, wherein the inductor detection unit comprises a resistor ladder coupled between the second output node and the comparator, and wherein the reference voltage is an image of an output level of the second output node, said image being provided to the comparator through said resistor ladder.

14. The method of claim 11, wherein the mode control unit is a finite state machine.

15. The method of claim 14, wherein the power supply circuit further comprises an oscillator that provides a clock signal to the finite state machine.

16. The method of claim 11, wherein the mode control unit causes the power supply circuit to operate in a first operating mode if the detection signal indicates that the inductor is present, wherein the first operating mode is a switch mode of operation.

17. The method of claim 16, wherein the switch mode of operation is a DC-DC converter mode.

18. The method of claim 11, wherein the mode control unit causes the power supply circuit to operate in a second operating mode if the detection signal indicates that the inductor is not present, wherein the second operating mode is a linear mode of operation.

* * * * *